Aug. 21, 1962 P. L. DATT 3,050,678
MAGNETIC TESTING SYSTEM FOR METALLIC BODIES
Filed Nov. 4, 1958 2 Sheets-Sheet 1

INVENTOR:
PAUL L. DATT
BY: James Todorovic
HIS ATTORNEY

INVENTOR:
PAUL L. DATT
BY: James Todorovic
HIS ATTORNEY

United States Patent Office 3,050,678
Patented Aug. 21, 1962

3,050,678
MAGNETIC TESTING SYSTEM FOR METALLIC BODIES
Paul L. Datt, Walnut Creek, Calif., assignor to Shell Oil Company, a corporation of Delaware
Filed Nov. 4, 1958, Ser. No. 771,857
3 Claims. (Cl. 324—37)

This invention relates to a method and apparatus for locating flaws and defects in materials capable of conducting electric current and more particularly to a system which will magnetically test with equal efficiency a wide variety of materials having different electrical characteristics.

Patents, Nos. 2,540,588 and 2,545,085, issued to M. V. Long describe a system for magnetically testing material capable of conducting electric current. In the systems disclosed in the Long patents a probe element which is provided with two probe coils connected in series is passed through or over the material to be tested. The probe coils form two adjacent legs of a bridge circuit whose unbalance is used to indicate the presence of a flaw in the material being tested. The probe in the Long patents is excited by an alternating current whose frequency range is stated to be about 100 to 20,000 cycles per second, although no means for readily varying the frequency is disclosed. The Long Patent 2,540,588 discloses the use of a probe having unequal or unbalanced coils in order that one may easily determine the presence of a wall section whose thickness is less than the nominal wall thickness of a tubular member. While this is useful in some cases in other cases it is desirable to suppress the response of the probe to wall thinning and increase its response to other flaws which requires the use of a probe having balanced coils.

While the testing system described in the Long patents is satisfactory for the materials disclosed (i.e., materials having low electrical resistance) it has several disadvantages. For example, the response of an apparatus such as disclosed in the Long patent when used for alloys having high electrical resistance, such as austenitic stainless steels and the like, is of small amplitude, thus, resulting in great difficulty in the detecting of the presence of a flaw in the member being tested. Also, with the device shown in the above patents it is substantially impossible to determine the precise character of the flaw which resulted in the response since different types of flaws give similar responses.

In order to provide a versatile magnetic testing apparatus which is capable of testing different materials having a wide variety of characteristics it is necessary to provide a system in which both the frequency of the current supplied to the probe and the phase of an associated current supplied to the discriminator circuit may be easily controlled. Furthermore, in order to be able to accurately determine the exact characteristics of the flaw being detected it is necessary to provide a probe having both substantially identical coils and coils which are unbalanced with respect to each other. These various control means must be provided in a convenient form since it is necessary to obtain a series of logs or chart records of the member being tested in order to accurately ascertain the exact characteristic of each individual flaw and in the case of wall thinning the approximate extent thereof.

Accordingly, it is the principal object of this invention to provide a magnetic testing apparatus with a normally balanced probe having substantially identical coils and an auxiliary means for easily unbalancing the circuit branches of the apparatus containing the probe coils when it is desired to vary the response characteristic of the probe.

A further object of this invention is to provide a magnetic detecting apparatus having a means for varying both the frequency of the current supplied to the probe coils as well as the phase of an associated current supplied to the discriminator circuit in order that one may easily determine both the characteristic of the flaw being detected as well as the extent thereof.

The above objects and advantages of this invention are obtained in a magnetic detecting apparatus by providing a probe having substantially identical coils and an unbalancing means mounted externally of the probe. The unbalancing means consists of resistances and inductances which may be selectively connected in series with one of the coils of the probe to unbalance the circuit branches containing the probe coil when it is desired to change the response characteristic of the apparatus. The detecting system is also provided with a means for shifting the phase of the oscillator signal supplied to the discriminator in order that one may utilize a phase shift which will give the optimum response for various materials and the flaws therein while permitting one to discriminate against unwanted signals.

The features of this invention will be more easily understood from the following detailed description of a preferred embodiment when taken in conjunction with the attached drawings in which.

Figure 1:
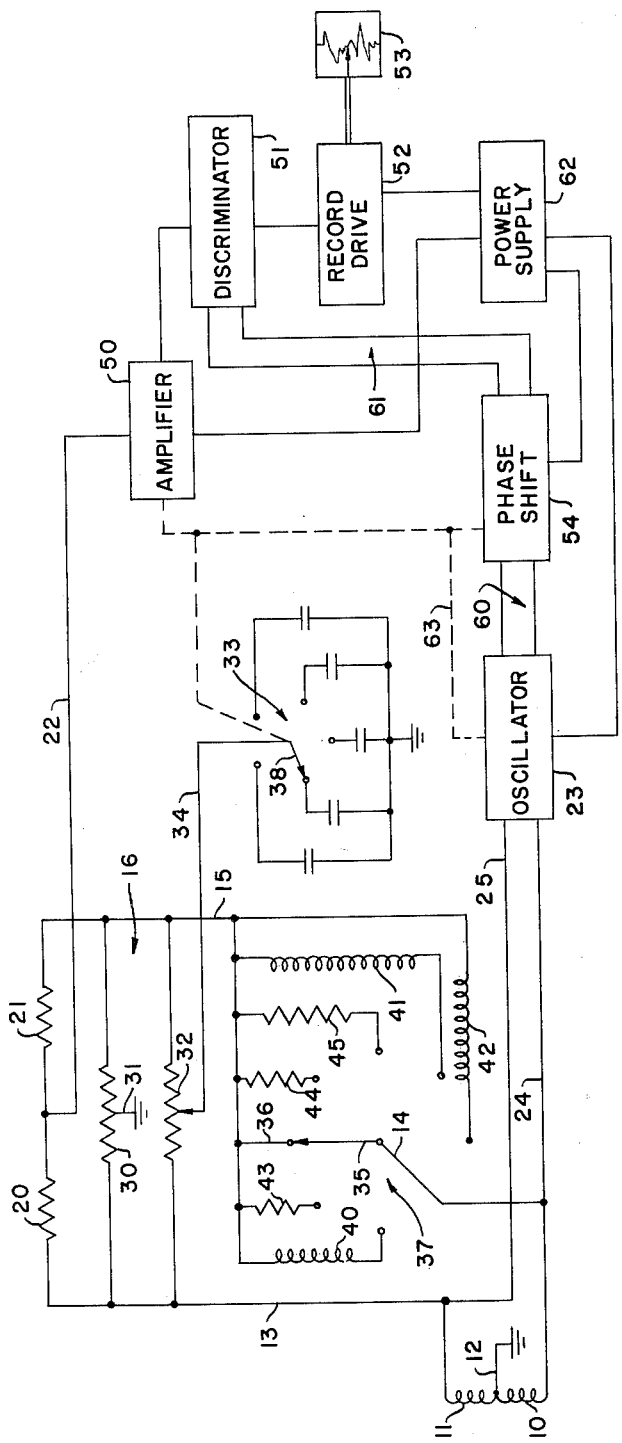
FIGURE 1 is a schematic drawing of a detecting apparatus constructed in accordance with this invention.

Referring now to FIGURE 1, there is shown a probe member having two probe coils 10 and 11 with the common connection between the two coils being connected to ground by a lead 12. The two probe coils 10 and 11 should have substantially equal coil factors which means they should have the same number of turns of the same size of wire and be wound on substantially identical coil forms. The coil 10 is connected to a resistance 21 forming the third arm of the bridge by means of leads 14, 15 and an unbalancing network 37 while the coil 11 is connected to a resistance 20 forming the fourth leg of the bridge by means of a lead 13. A bridge balancing network 16 is disposed in parallel relationship with the two probe coils and the two resistances 20 and 21 for accurate balancing of the bridge. The unbalance signal from the bridge is transmitted to the remainder of the detecting system circuit by means of a lead 22. The bridge is energized by an alternating signal supplied by an oscillator 23 which is connected to the ends of the coils 10 and 11 by means of leads 24 and 25. The oscillator 23 may be any well known electronic audio frequency oscillator which is provided with a means for varying the frequency of its output over a wide range of frequencies.

The bridge balancing circuit 16 consists of a variable resistance or potentiometer 30 whose movable contact is connected to ground by means of a lead 31 and a second variable resistance or potentiometer 32 whose movable contact is connected by means of a lead 34 to a capacitor bank 33. The capacitor bank 33 is shown as a group of five capacitors having a switch means 38 for connecting any one of the five capacitors in series with the movable contact of the potentiometer 32, the other side of the capacitor bank being grounded. The position of the switch arm 38 of the capacitor bank is controlled by the means used for varying the frequency of the oscillator 23 as will be explained below.

From the above description it can be seen that the two probe coils 10 and 11 form two legs of a bridge circuit with the third and fourth legs being formed by the resistances 20 and 21. The potentiometer 30 provides a means for balancing the bridge resistively while the potentiometer 32 and capacitance bank 33 provide a means for balancing the bridge reactively. Thus, it is possible to electrically balance the bridge with the probe connected therein in order to compensate for any slight discrepancy between the two probe coils 10 and 11. The oscillator 23 provides the energizing signal for the probe, while the means used for varying the frequency of the oscillator controls the setting of the remaining components of the system as will be described below.

The unbalancing circuit 37 is disposed so that the various elements of the unbalancing circuit may be selectively connected in a series with the probe coil 10 by rotating the selector switch 35. The unbalancing circuit consists of three inductance elements 40, 41 and 42 and three resistance elements 43, 44 and 45 and a direct connection 36. The values of the inductance and resistance elements making up the unbalancing circuit 37 should be chosen so as to give a wide range of adjustment for unbalancing the branch of the bridge containing the probe coil 10 with respect to the branch containing the probe coil 11. Suitable values for these elements would be on the order of 0.25 to 5 ohms for the resistances and 0.25 to 5 millihenrys for the inductances. The unbalancing circuit 37 provides a simple means by which the branch of the bridge containing the coil 10 may be switched from a balance position in which the switch 35 would be aligned with the direct connection 36 to an inductive unbalance condition by positioning the switch 35 adjacent one of the inductances 40, 41 or 42 to a resistive unbalanced condition by positioning the switch arm adjacent one of the resistances 43, 44 and 45. This provides a simple means for easily adjusting the branch of the bridge containing coil 10 between a balanced and unbalanced position which allows one to obtain varying response at any one frequency to different defect types.

The unbalance signal of the bridge is coupled to the amplifier 50 by the lead 22. The amplifier 50 can be any well known type of voltage amplifier which is provided with a variable filter means or a means for tuning the amplifier to a predetermined frequency. In order to insure that the proper filter or tuning circuit is coupled to the amplifier a connection 63 is provided between the oscillator 23 and the amplifier 50 in order that the proper filter or tuning circuit will be coupled to the amplifier circuit when the frequency of the oscillator is changed. This connection which is shown by the schematic line 63 and may be either a mechanical or electrical connection depending on the circuits used. The oscillator frequency selector switch is also connected to the capacitance bank 33 by the connection 63 so that a capacitor of the proper size will be disposed in the ground circuit of the resistance 32 for each frequency of the oscillator. By including the proper capacitor in the return to ground from slider of the resistance 32 the reactive balancing of the bridge circuit is simplified.

The signal from the amplifier is coupled to a discriminator circuit 51 where its phase is compared with the pase of the original oscillator signal supplied to the bridge as determined by the phase shifting circuit 54. The phase shifting circuit 54 is coupled to the oscillator by means of a lead 60 and to the discriminator circuit by means of leads 61 and is utilized for shifting the phase of the oscillator signal supplied to the discriminator circuit 51 in order that maximum phase angle response may be obtained from the probe for various type defects in various materials. This, thus, provides a means for identifying the various defects as will be explained more fully below. A single power supply 62 is provided for all the various units of the system. The output of the discriminator which is component of the unbalance signal which is in phase with the reference signal supplied to the discriminator is used for activating a chart recording instrument 52 which in turn transcribes the usual chart record 53.

Figure 2:
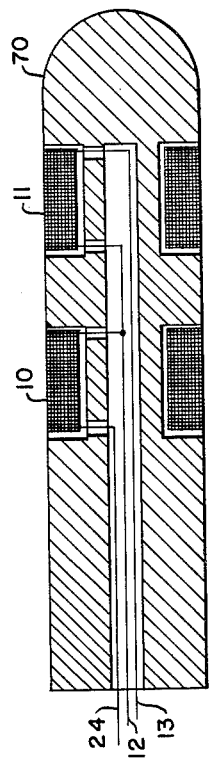
FIGURE 2 is a longitudinal cross-section of a probe constructed in accordance with this invention.

The particular construction details of one probe are shown in FIGURE 2 in which 70 is the main body of the probe. The body of the probe can be formed from a nonmagnetic material which has substantially the same permeability as air such as a plastic material or fiber. For the operating frequency described, greater defect sensitivity can be obtained by winding the coils on a high permeability core material such as a high nickel content steel. The coils 10 and 11 are mounted in coil grooves formed in the outer surface of the member 70 and consist of a large number of turns of very fine size for example 1000 turns of number 40 enameled copper wire. The leads 12, 13 and 24 from the coils 10 and 11 pass out through a central opening in the probe body 70 to one end of the probe in order that it may be passed through long members. The leads 12, 13 and 24 may be joined to a suitable conductor cable which in addition to containing the leads should have sufficient physical strength to act as a support for the probe.

Figure 3:
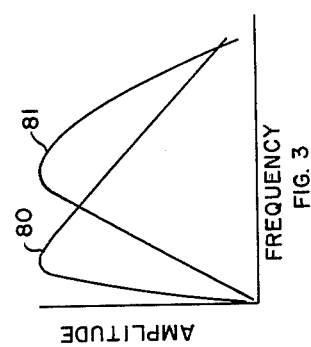
FIGURE 3 is a graph showing the amplitude of the response of the apparatus with respect to changes in the frequency of the oscillator current for various materials.

In order to understand the operation and advantages of this invention, reference is now made to FIGURES 3–11 which show the response of the instrument to various types of defects in a variety of materials. FIGURE 3 shows two curves 80 and 81 which are the variation in the amplitude response of the system to defects in two different types of materials as the frequency of the oscillator is varied. The curve 80 represents the response for a typical conducting alloy such as a brass while the curve 81 is a typical response curve for an alloy having high resistivity such as austenitic stainless steel or similar material. From comparison of these curves it will be noticed that the maximum amplitude in a brass alloy is attained at a relatively low frequency on the order of 100 to 1000 cycles per second while maximum response in alloys of high resistivity are attained at a high frequency on the order of 10,000 to 20,000 cycles per second. In the previous detecting systems referred to above no information was given as to the desirability of using a variable frequency or the results that could be obtained when the frequency was properly selected to give maximum penetration in the particular material and gauge being tested.

Figure 4:
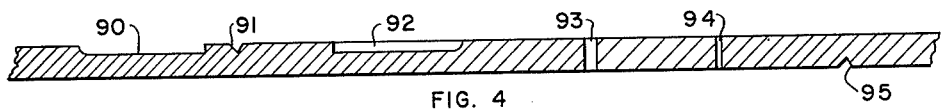
FIGURE 4 is a cross-section of a tubular member having defects of known characteristics.

Referring now to FIGURE 4, there is shown a longitudinal section of a piece of tubular material having defects of known character. The defect 90 represents a thinning wall section, the defect 91 represents an annular crack or groove, the defect 92 represents a longitudinal crack, the defect 93 represents a large size hole, the defect 94 represents a smaller hole and the defect 95 represents a small pit on the interior of the tubular member.

Figure 5:
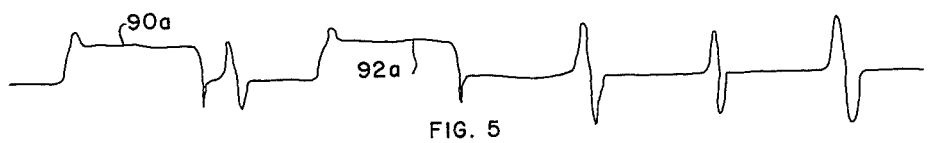
FIGURES 5–11 are chart records showing the amplitude of the apparatus response as it passes through the member shown in FIGURE 4 with the member made of various materials and the apparatus circuit operated under various conditions.

Referring now to FIGURE 5, there is shown a chart record of the response of the prior apparatus to the flaws in the member of FIGURE 4 with the member being formed of a brass alloy. The prior probe was operated with unbalanced coils and at a relatively low frequency on the order of 1000 cycles per second. From this plot it can be seen that the response 90a and 92a of the apparatus to the thin wall section 90 and the longitudinal crack 92, respectively, are substantially the same. Thus, it is impossible to accurately ascertain exactly what type of defect is indicated from the chart record of the probe response.

Figure 6:
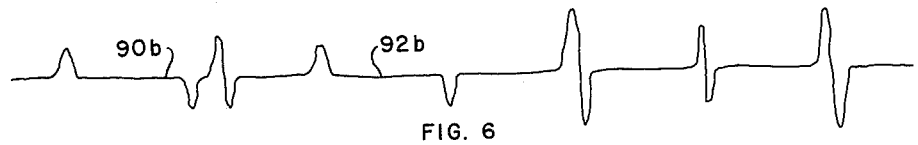

FIGURE 6 is a chart record of the tubing sample of FIGURE 4 when using a probe having balanced coils and a low test frequency. From this chart it can be seen that the probe still gives substantially identical responses 90b and 92b to the flaws in the member shown in FIGURE 4 and that it is still impossible to tell whether the flaws 90 and 92 are actually cracks or thin wall sections. Furthermore the use of a probe having balanced coil circuits and a low frequency permits one to see only the start and end of the flaws 90 and 92.

Figure 7:
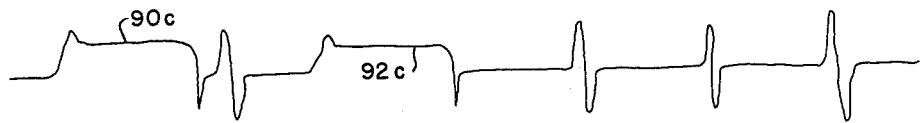

FIGURE 7 illustrates a chart record of the tubing sample of FIGURE 4 when using a probe constructed in accordance with this invention, operated at low frequency but with inductively unbalanced coil circuits. The response of the probe of this invention when operated under these conditions is substantially the same as the probe of the prior apparatus and again it is substantially impossible to tell whether the flaws 90 and 92 are thin wall secctions or longitudinal cracks.

Figure 8:
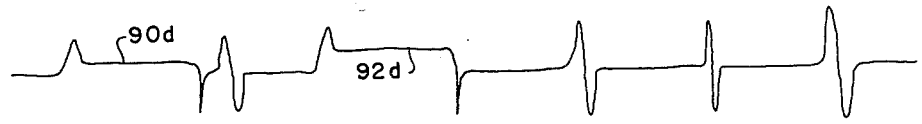

FIGURE 8 shows the response of the apparatus of this invention operated with resistively unbalanced coils and adjusting the phase of the oscillator signal supplied to the discriminator 51 until it is approximately 45 degrees out of phase with reference to the oscillator signal supplied to the probe coils. Using this type of probe circuit unbalance and indicated adjustment of the oscillator signal it can be seen that the amplitude response 92d of the probe coils to the longitudinal crack 92 has been considerably increased while the response 90d to the thin wall section 90 has been substantially decreased, thus, it is a simple matter to determine that the flaw 90 represents a thin wall section and that the flaw 92 represents a longitudinal crack.

From the above it can be seen that in order to completely test an object it is necessary to run at least two and sometime more checks on the object in order to accurately ascertain the character of the particular flaw being detected by the apparatus. Thus, it can be seen that it is necessary to utilize an instrument which has both a means for readily changing the balance of the coil circuits between a balanced condition and inductive or resistive unbalanced condition as well as a means for shifting the phase angle between the oscillator signal supplied to the probe and the oscillator signal supplied to the discriminator 51. These adjustments are impossible to make in the devices shown in the referenced patents but are easily obtained in this device by means of the unbalancing circuit 37 and the phase shifter 54. The use of a circuit for readily unbalancing the probe and another circuit for shifting the phase of the oscillator signal greatly increase the utility of the prior art device while at the same time providing a means for easily determining the exact characteristic of the flaws detected by the apparatus.

Figure 9:
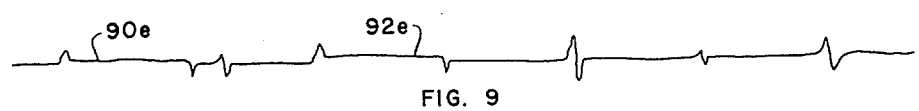

FIGURE 9 represents a response of the apparatus shown in the prior patents when operated at the low frequency specified therein with unbalanced coils in a high resistance material such as austenitic stainless steel. From this chart it can be seen that the response of the apparatus barely exceeds the noise level of the instrument and thus it is impossible to detect flaws or to determine their exact characteristic. This results both from the low frequency used and the inability to adjust phase of the oscillator signal supplied to the detector circuit 51 for maximum phase angle response.

Figure 10:
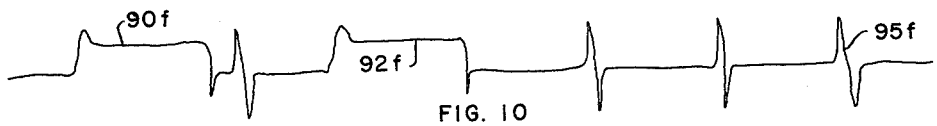
Figure 11:
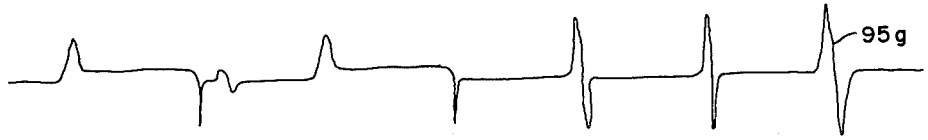

FIGURE 10 illustrates the chart record of the tubing sample of FIGURE 4 using the apparatus of this invention, operated in an inductive unbalanced condition and at the optimum frequency for high resistance alloys. The optimum frequency for high resistance alloys is on the order of 10,000 to 20,000 cycles per second depending on tube gauge. In order to determine whether the defects are on the inner or outer surface and whether they are holes or pits it is necessary to operate the probe at above its optimum frequency as well as varying the phase of the reference signal. FIGURE 11 shows a chart record of the sample of FIGURE 4 with the apparatus of this invention operated at about 20,000 cycles per second which when compared to the record in FIGURE 10 shows that the response of the probe to the pit 95 on the inner surface is considerably increased. If the pit 95 had been a pit on the outer surface, the response would have decreased while if it were a hole going completely through the tubular member the response would have also increased. In order to determine whether the defects are pits on the inner surface or holes it is necessary to vary the phase of the reference and note the response of the apparatus.

From the above description it can be seen that this invention has greatly increased the utility and usefulness of magnetic testing apparatus such as those shown in the above referenced patents. This increased utility is obtained by providing a means for readily unbalancing the probe coil circuits in either an inductive or resistive manner as well as a means for varying the phase shift between the oscillator signal supplied to the probe coils and the oscillator signal supplied to the discriminator. As explained above, by varying either one or both of these quantities and running a plurality of tests on a member it is possible to accurately determine the exact characteristic and extent of the flaws in the member. Accordingly, this invention should not be limited to the particular details described above for purposes of illustration but only to its broad scope and spirit.

I claim as my invention:

1. A magnetic detaching apparatus comprising: a sensing probe including two coils having substantially equal coil factors, said coils being disposed in the adjacent arms of a bridge circuit; impedance means disposed in series relationship with one of said coils for electrically unbalancing said one coil; switch means for selectively connecting and disconnecting said impedance means from said one coil; means for applying an oscillating voltage to two corners of said bridge, means for comparing the phase of the unbalance signal with the phase of the applied oscillating voltage and recording means for recording the in-phase component of the unbalance signal and circuit means disposed to shift the phase of said oscillating voltage supplied to said comparing means with respect to the signal supplied to said bridge.

2. A magnetic detecting apparatus comprising: a probe member having two axially spaced coils of substantially equal coil factors, the coils of said probe being disposed in the adjacent arms of a bridge; a first variable impedance means disposed across opposite corners of said bridge to electrically balance said bridge; a second variable impedance means disposed in series with one of the coils of said probe; switch means for inserting and removing said second variable impedance in series with said one coil of said probe; a source of alternating voltage coupled to said opposite corners of the bridge; means for controlling the frequency of said alternating voltage; means for comparing the phase of the unbalance signal of said bridge with phase of said alternating voltage and means coupled to said comparing means and said alternating voltage source for shifting the phase of the alternating voltage supplied to said comparing means.

3. A probing device for magnetic detecting apparatus comprising:
    a core member, at least a pair of longitudinally spaced coaxial coils mounted on said members, said coils in addition having substantially equal coil factors;
    a bridge circuit having two legs formed by said coils;
    an impedance means disposed to be selectively coupled in series with one of said coils to electrically unbalance said bridge;
    and measuring means coupled to said bridge circuit to measure the unbalance thereof.

References Cited in the file of this patent

UNITED STATES PATENTS

| | | |
|---|---|---|
| 2,415,789 | Farrow | Feb. 11, 1947 |
| 2,540,588 | Long | Feb. 6, 1951 |
| 2,540,589 | Long | Feb. 6, 1951 |
| 2,844,787 | McCann | July 22, 1958 |
| 2,911,588 | Wetherhold | Nov. 3, 1959 |